(12) United States Patent
Tally et al.

(10) Patent No.: US 7,956,285 B2
(45) Date of Patent: Jun. 7, 2011

(54) FLOOR STAND FOR MOUNTING AN ELECTRICAL BOX

(75) Inventors: Brandon Michael Tally, Greenville, IL (US); Andrew C. Kamm, Highland, IL (US)

(73) Assignee: Cooper Technologies Company, Houston, TX (US)

( * ) Notice: Subject to any disclaimer, the term of this patent is extended or adjusted under 35 U.S.C. 154(b) by 438 days.

(21) Appl. No.: 12/167,419

(22) Filed: Jul. 3, 2008

(65) Prior Publication Data

US 2010/0000783 A1    Jan. 7, 2010

(51) Int. Cl.
*H01H 9/02* (2006.01)

(52) U.S. Cl. ............... 174/58; 174/53; 174/57; 174/61; 220/3.2; 220/3.3; 220/3.7; 248/906

(58) Field of Classification Search .......... 174/480, 174/481, 50, 53, 57, 58, 505, 61, 503, 54, 174/63, 496; 220/3.2–3.9, 4.02; 248/27.1, 248/300, 56, 57, 68.1, 343, 205.7, 82, 201, 248/906; 439/535; 52/220.7, 220.8; 312/345
See application file for complete search history.

(56) References Cited

U.S. PATENT DOCUMENTS

| | | |
|---|---|---|
| 949,576 A | 2/1910 | Hunter |
| 1,056,759 A | 3/1913 | Mallery |
| 1,211,182 A | 1/1917 | Kruse |
| 1,288,024 A | 12/1918 | Kendig |
| 1,756,361 A | 4/1930 | Johnson |
| 1,790,031 A | 1/1931 | Vaughn |
| 1,982,957 A | 12/1934 | Knell |
| 2,223,910 A | 12/1940 | Gallagher |
| 2,269,211 A | 1/1942 | Kuykendall |
| 2,486,764 A | 11/1949 | Singer |
| 2,881,924 A | 4/1959 | Kruse |
| 3,038,020 A | 6/1962 | Winter |
| 3,039,729 A | 6/1962 | Nagle, Sr. |
| 3,182,805 A | 5/1965 | Foster, Jr. |
| 3,387,343 A | 6/1968 | Fitz-Gerald |
| 3,528,636 A | 9/1970 | Schmidt |
| 4,158,471 A | 6/1979 | Logsdon |
| 4,480,164 A | 10/1984 | Dills |
| 4,637,422 A | 1/1987 | Izzi, Sr. |
| 4,790,505 A | 12/1988 | Rose |
| 4,832,297 A | 5/1989 | Carpenter |
| 4,964,525 A | 10/1990 | Coffey |
| 5,009,383 A | 4/1991 | Chapman |
| 5,098,046 A | 3/1992 | Webb |
| 5,114,105 A | 5/1992 | Young |
| 5,141,185 A | 8/1992 | Rumbold |

(Continued)

OTHER PUBLICATIONS

Cooper B-Line Catalog, pp. 57-59 (admitted prior art).

(Continued)

*Primary Examiner* — Angel R Estrada
(74) *Attorney, Agent, or Firm* — Senniger Powers LLP

(57) ABSTRACT

A floor stand is disclosed for mounting an electrical box at a location above a floor between two wall studs. The floor stand has an elongate sheet metal body and at least one mounting arm attached to the body. In one embodiment, the mounting arm is bendable from a position extending lengthwise of the body to a position in which it extends generally laterally outward from the body for attachment to one of the wall studs. In another embodiment, the two mounting arms are detachable from the body and re-attachable in the stated second position. An optional cable-containment section for connection to the box-mounting section of the floor stand is also disclosed.

28 Claims, 18 Drawing Sheets

U.S. PATENT DOCUMENTS

| | | | |
|---|---|---|---|
| 5,224,673 | A | 7/1993 | Webb |
| D342,938 | S | 1/1994 | Cheatham |
| 5,288,041 | A | 2/1994 | Webb |
| 5,330,137 | A | 7/1994 | Oliva |
| 5,354,952 | A | 10/1994 | Hickey |
| 5,393,026 | A | 2/1995 | Deschamps |
| 5,405,111 | A | 4/1995 | Medlin, Jr. |
| 5,423,499 | A | 6/1995 | Webb |
| 5,448,011 | A | 9/1995 | Laughlin |
| 5,516,068 | A | 5/1996 | Rice |
| 5,527,990 | A | 6/1996 | Comerci |
| 5,698,820 | A | 12/1997 | Collard |
| 5,765,786 | A | 6/1998 | Gretz |
| 5,883,332 | A | 3/1999 | Collard |
| 5,927,667 | A | 7/1999 | Swanson |
| 5,931,425 | A | 8/1999 | Oliva |
| 6,098,939 | A | 8/2000 | He |
| 6,147,306 | A | 11/2000 | Wilkins |
| 6,188,022 | B1 | 2/2001 | He |
| 6,209,836 | B1 | 4/2001 | Swanson |
| 6,230,464 | B1 | 5/2001 | Vrame |
| 6,375,017 | B1 | 4/2002 | Schattner |
| 6,384,334 | B1 | 5/2002 | Webb |
| 6,545,214 | B2 | 4/2003 | Russell |
| 6,573,449 | B2 | 6/2003 | Vrame |
| 6,590,155 | B2 | 7/2003 | Vrame |
| 6,723,918 | B2 | 4/2004 | Vrame |
| 6,765,146 | B1 * | 7/2004 | Gerardo .......... 174/58 |
| 6,803,521 | B2 | 10/2004 | Vrame |
| 6,996,943 | B2 * | 2/2006 | Denier et al. ........ 174/50 |
| 7,053,300 | B2 | 5/2006 | Denier |
| 7,271,335 | B2 | 9/2007 | Dinh |
| 7,271,336 | B2 | 9/2007 | Dinh |
| 7,271,353 | B1 | 9/2007 | Lewis |
| 7,285,722 | B2 | 10/2007 | Shyr |
| 7,394,020 | B2 | 7/2008 | Gerardo |
| 7,592,542 | B1 * | 9/2009 | Gerardo .......... 174/58 |
| 2005/0067541 | A1 | 3/2005 | Dinh |
| 2005/0067546 | A1 | 3/2005 | Dinh |

OTHER PUBLICATIONS 4 photos of prior art electrical box mounting bracket.

* cited by examiner

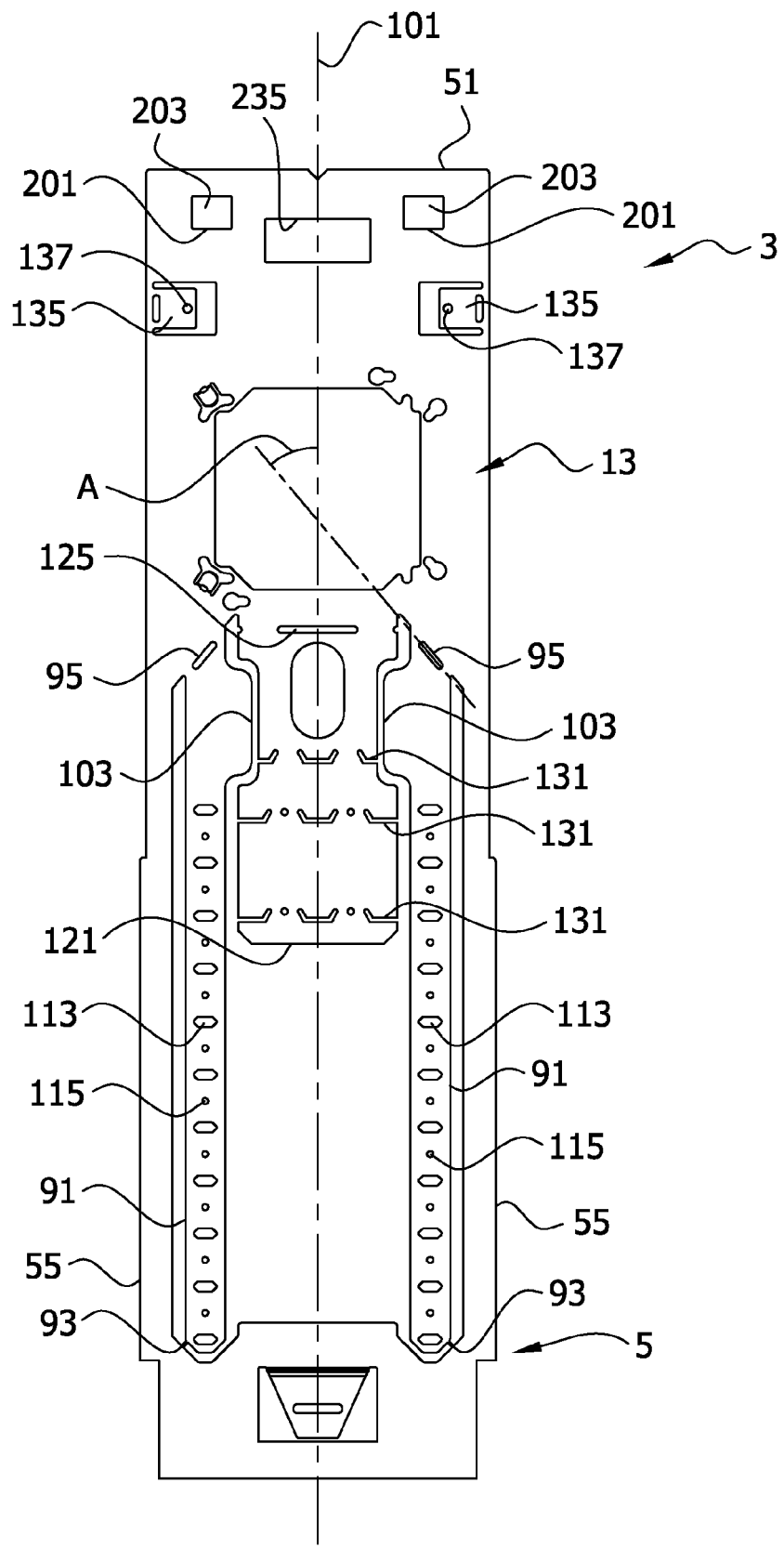

US 7,956,285 B2

FLOOR STAND FOR MOUNTING AN ELECTRICAL BOX

FIELD OF THE INVENTION

The present invention generally relates to electrical box mounting devices and, more particularly, to a floor stand for mounting an electrical box.

BACKGROUND OF THE INVENTION

Electrical (junction) boxes are mounted in various ways by different types of brackets. One type of bracket, commonly referred to as a floor stand, is used for mounting an electrical box in a wall where the box is too far from an adjacent wall stud to use a conventional stud-mounted bracket. One particular type of floor stand is fabricated from sheet metal and is designed for attachment at its lower end to a horizontal floor stud. The bracket extends vertically up from the floor stud and has a box mounting section adjacent its upper end to which an electrical box is fastened. After the bracket and electrical box are installed, the wall is completed by securing appropriate sections of dry wall to the studs. Reference may be made to U.S. Pat. No. 5,288,041 showing an example of such a bracket. Because this type of floor stand is attached to the framing of the wall only at its lower end, the upper end of the floor stand and the mounting box attached to it have a tendency to move. Efforts have been made to brace the floor stand against such movement, but none of these efforts have proven to be particularly successful and/or efficient.

SUMMARY OF THE INVENTION

In general, this invention is directed to a floor stand for mounting an electrical box at a location between two wall studs. The floor stand comprises an elongate sheet metal body having opposite ends and a box-mounting section between the opposite ends configured for mounting an electrical box. At least one sheet metal mounting arm is attached to the body. The at least one mounting arm is bendable from a first position in which it extends generally lengthwise of the body to a second position in which it extends generally laterally outward from the body for attachment to one of the wall studs. The mounting arm remains attached to the body in its second position.

In another aspect, this invention is directed to a floor stand for mounting an electrical box at a location between two wall studs. The floor stand comprises an elongate sheet metal body having opposite ends and a box-mounting section between its opposite ends configured for mounting an electrical box. First and second sheet metal mounting arms on the body extend generally laterally outward from the body at opposite sides of the body for attachment to said wall studs.

In another aspect, this invention is directed to a floor stand comprising an elongate sheet metal body having opposite ends and a box-mounting section between its opposite ends configured for mounting an electrical box. The floor stand also includes a sheet metal cable-containment section comprising a lower portion adapted for connection to the box-mounting section, a cable-containing flap adapted to extend rearward from an upper edge of said lower portion, at least one opening in the flap for receiving cable passing to or from the electrical box, and a cable holding mechanism associated with the flap for holding the cable in place.

In another aspect, this invention is directed to a floor stand for mounting an electrical box at a location between two wall studs. The floor stand comprises an elongate sheet metal body having opposite ends and a box-mounting section between the opposite ends configured for mounting an electrical box. Two sheet metal mounting arms have frangible connections with the body to permit detachment of the mounting arms from the body. Each mounting arm is configured for re-attachment to the body in a position in which the arm extends laterally out from a side of the body for securement to a wall stud.

Other objects and features will be in part apparent and in part pointed out hereinafter.

BRIEF DESCRIPTION OF THE DRAWINGS

FIG. 6 is a flat pattern of the floor stand;

Corresponding reference characters indicate corresponding parts throughout the drawings.

DETAILED DESCRIPTION

Figure 1:
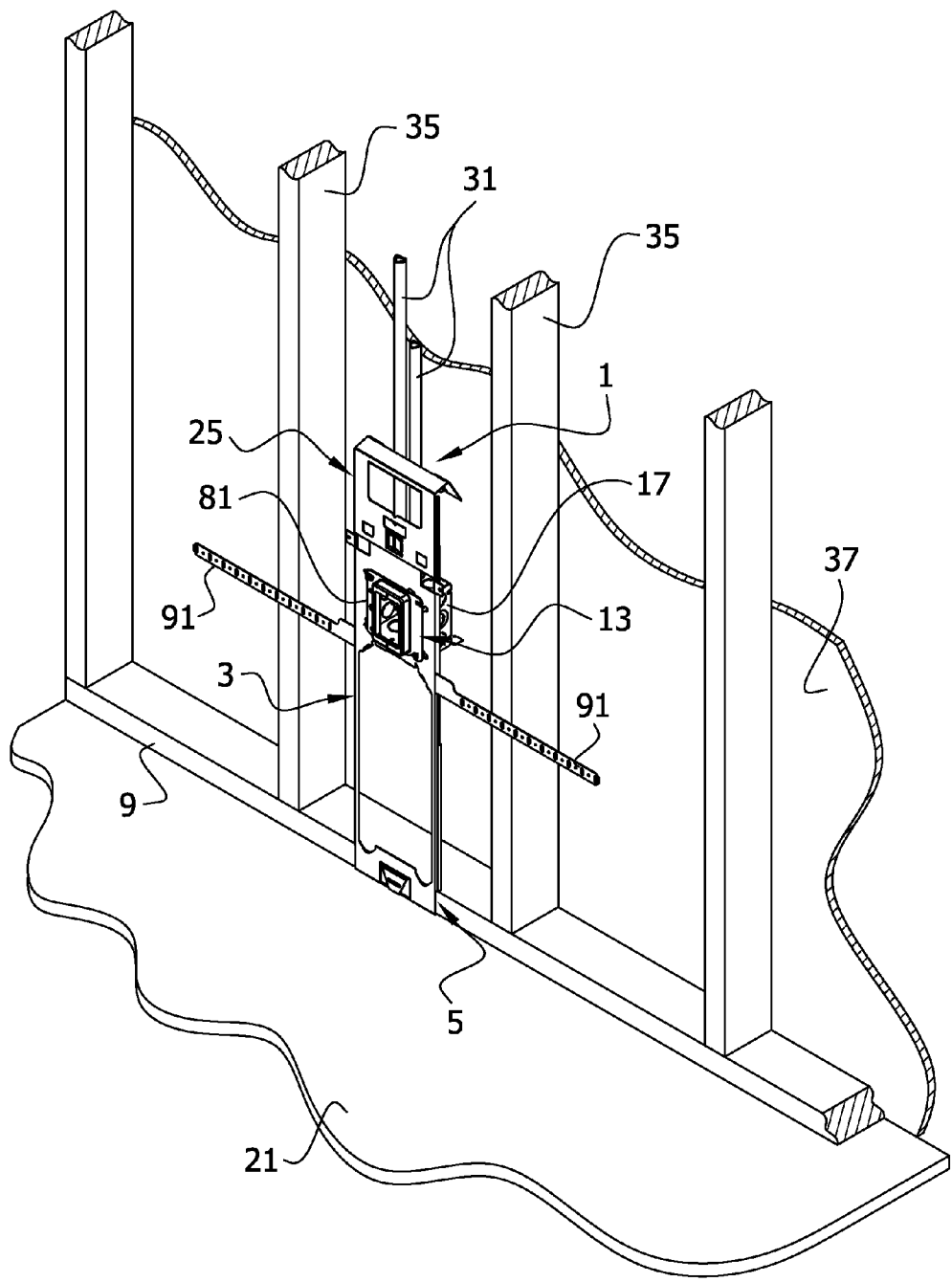
FIG. 1 is a perspective view of one embodiment of a floor stand of this invention mounting an electrical box in a wall comprising a rear drywall section.
Figure 2:
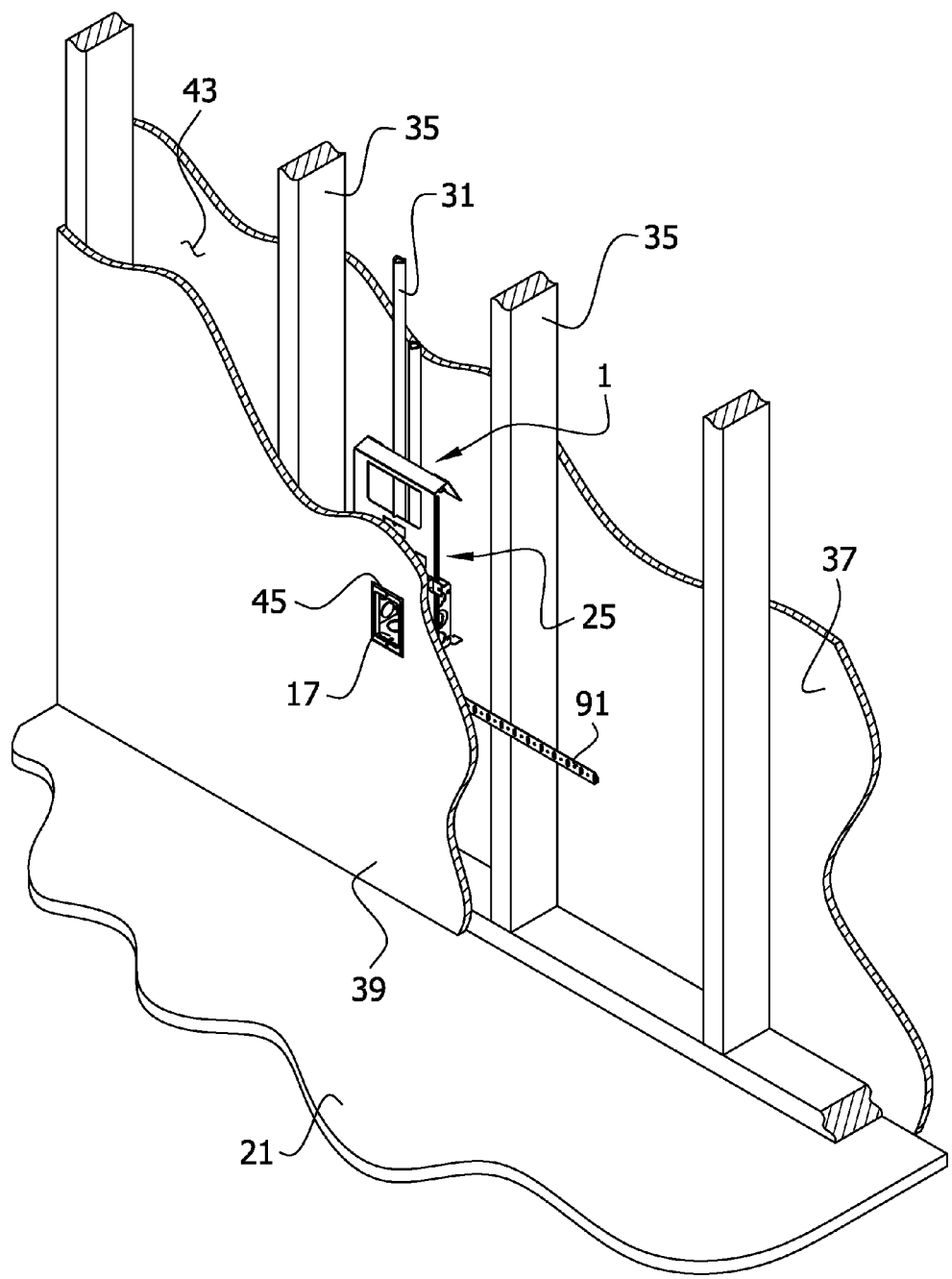
FIG. 2 is a view similar to FIG. 1 showing portions of a front drywall section.

Referring now to FIGS. 1 and 2, one embodiment of a floor stand of this invention is indicated in its entirety by the reference number 1. The floor stand 1 comprises an elongate upright body 3 having a lower section 5 which may be configured for attachment to a floor stud 9 and a box mounting section 13 for mounting an electrical box 17 at an elevation above the floor 21. The floor stand also includes an optional cable-containment section 25 which may be connected to the box-mounting section 13 for containing cable 31 extending to and from the box 17. Typically, the floor stand 1 will be installed between two vertical wall studs 35.

FIG. 1 shows a rear section 37 of dry wall installed, and FIG. 2 shows portions of a front section 39 of dry wall installed generally parallel to and spaced from the rear section to define a wall cavity 43. An opening 45 is cut in the front section of dry wall to expose the electrical box.

Figure 4:
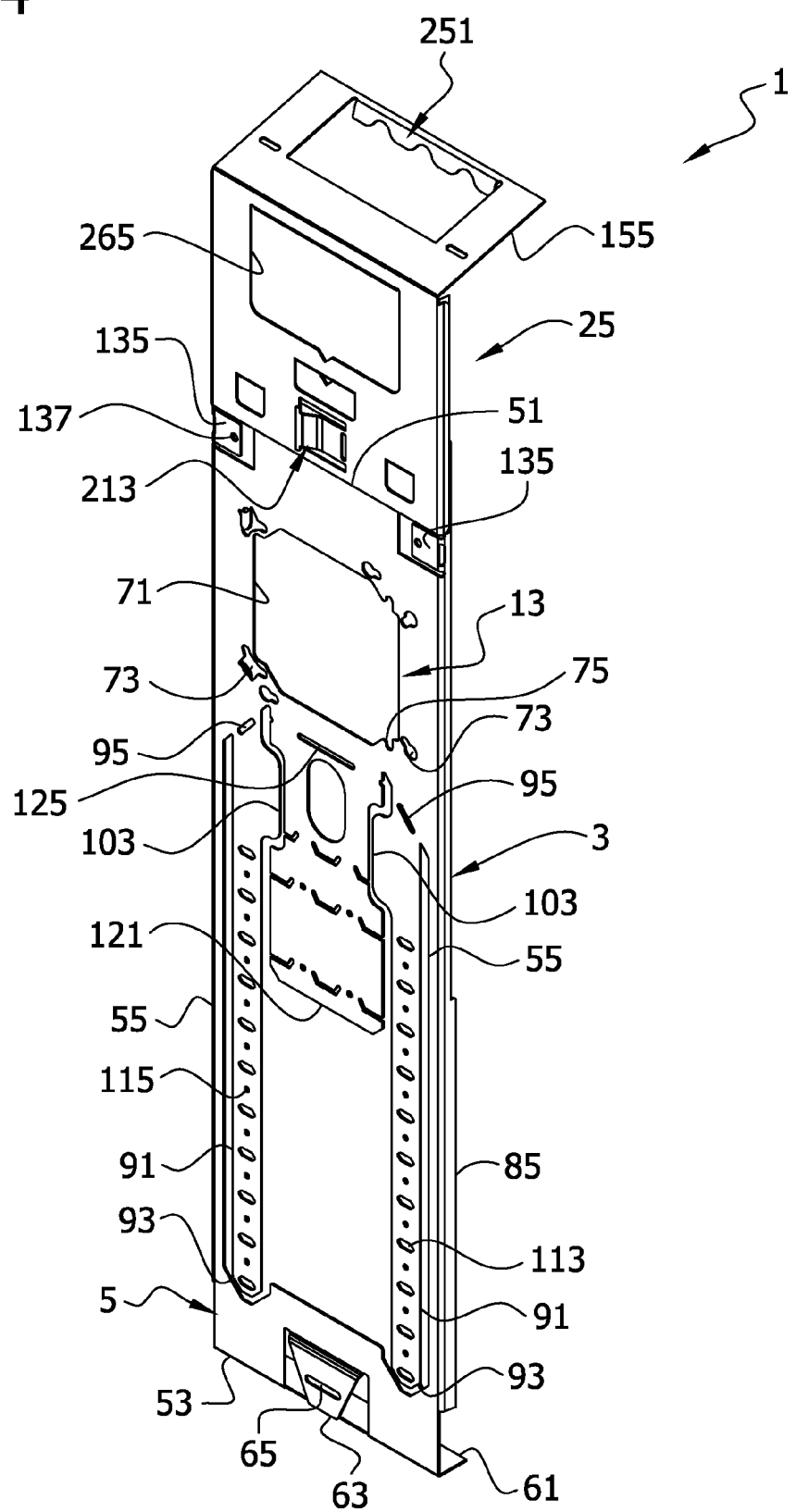
FIG. 4 is a front perspective view of the floor stand showing mounting arms in an unbent condition.

Referring to FIG. 4, the body 3 of the floor stand 1 is preferably (but not necessarily) integrally formed as one piece from a suitable material such as sheet metal. The body 3 has upper and lower ends 51, 53, opposite sides 55 and, in this embodiment, is generally rectangular in shape. Other shapes are possible. The lower section 5 of the body 3 comprises a foot 61 bent rearward from the body for placement either between the floor and the floor stud 9 (as shown in FIG. 1) or inside the floor stud 9, and a fastening flap 63 having a fastener opening 15 for receiving a fastener to secure the floor stand 1 to the floor stud, if desired. The box-mounting section 13 of the body 3 comprises a large central opening 71 and a plurality of screw holes 73 and slots 75 around the central opening for securing the box 17 to the rear face of the body and a plaster ring 81 to the front face of the body (see FIG. 1), as will be understood by those skilled in the art. Thus, when the installation is finished, the body 3 of the floor stand is sandwiched between the electrical box 17 and the plaster ring 81. Flanges 85 are provided along opposite sides 55 of the body for reinforcing the sheet metal.

In accordance with one aspect of this invention, the body 3 of the floor stand 1 is stabilized by at least one and preferably two mounting arms 91 desirably formed integrally as one piece with the body of the bracket (e.g., in a stamping operation). In the illustrated embodiment, the arms 91 are formed separate from one another as flat metal arms (straps) having upper ends attached to the body at locations inboard of the sides 55 of the body adjacent the central box mounting opening 71 and lower ends generally adjacent the lower section 5 of the body. The lower ends of the arms 91 are temporarily attached by frangible connections 93 (e.g., tabs) to the lower section 5 of the body of the floor stand. These connections are capable of being readily severed (e.g., cut or otherwise broken manually or by an appropriate tool) so that the arms can be bent rearward about bend lines 95 adjacent their upper ends from the first position shown in FIG. 4 in which the arms are generally co-planar with the body to the second position in FIG. 5 in which the arms extend laterally outward from opposite sides of the body 3 for attachment to the adjacent wall studs 35 to stabilize the floor stand. In this embodiment, the mounting arms 91 remain attached to the body 3 before, during and after the movement of the arms from their first position to their second position. The temporary attachment of the lower ends of the arms 91 to the body 3 by means of the frangible connections 93 helps to prevent tangling of the arms with other objects prior to installation of the floor stand in the field and may also facilitate the manufacturing process. However, it will be understood that the arms 91 can be formed without this temporary attachment within the scope of this invention.

Figure 5:
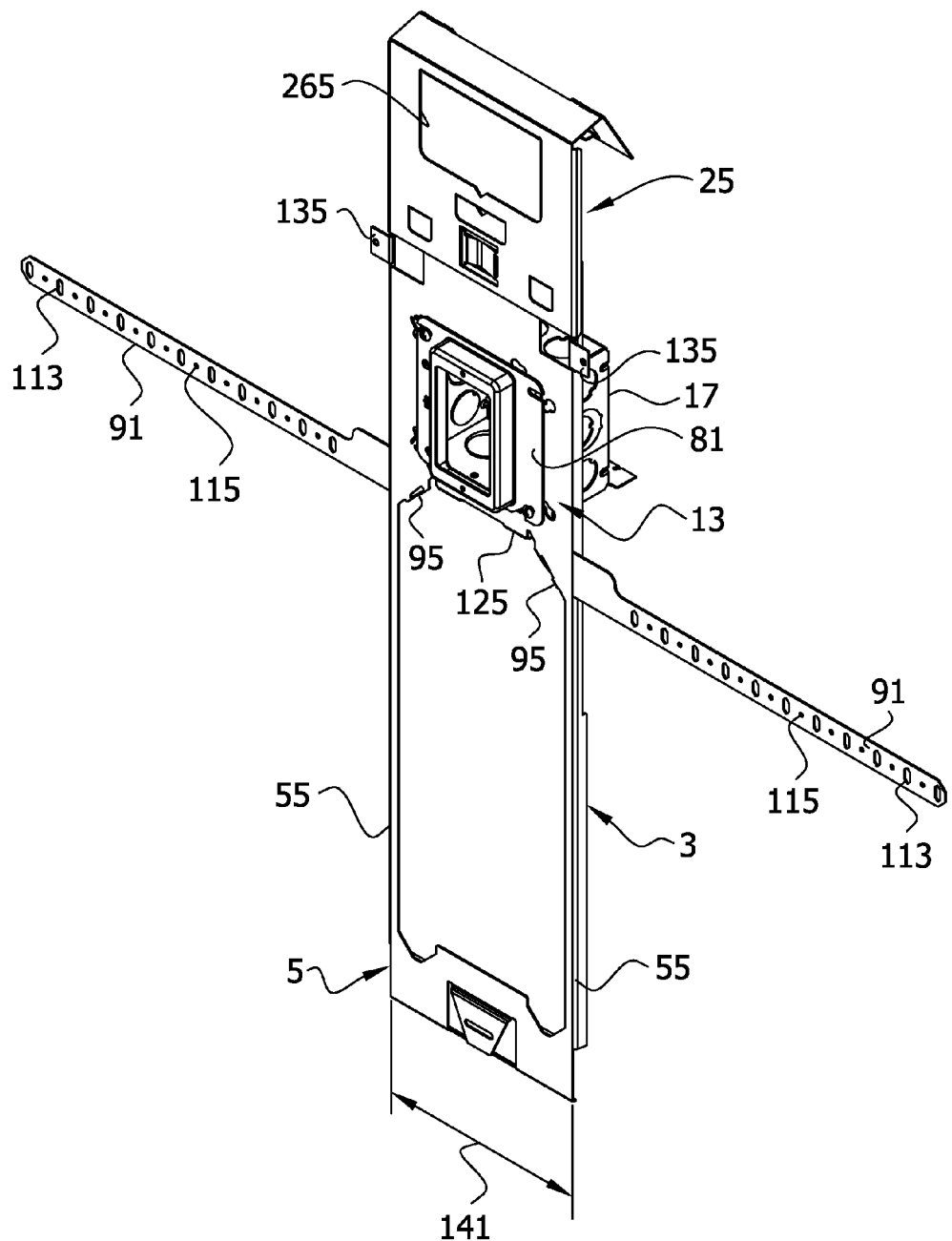
FIG. 5 is a view similar to FIG. 4 but showing the mounting arms bent to extend laterally outward for attachment to wall studs.

As best shown in FIG. 6, the bend lines 95 for facilitating bending of the mounting arms 91 are defined by slots (also indicated at 95) placed at an angle A relative to a longitudinal axis 101 of the body. In one embodiment, this angle A is about 40 degrees so that the mounting arms 91 extend generally parallel to the longitudinal axis 101 of the body when they are in their unbent position and generally at right angles to this axis when they are bent to extend laterally outward from respective sides of the body, as shown in FIG. 5. Angle A may vary. In general, however, it is desirably in the range of 35-50 degrees. Further, the bend lines may be established by lines of weakness comprising something other than slots 95. To facilitate the bending process, finger tabs 103 are provided on the arms 91 adjacent their upper ends. These tabs 103 provide additional area for pressing the arms rearward to initiate bending.

Figure 5A:
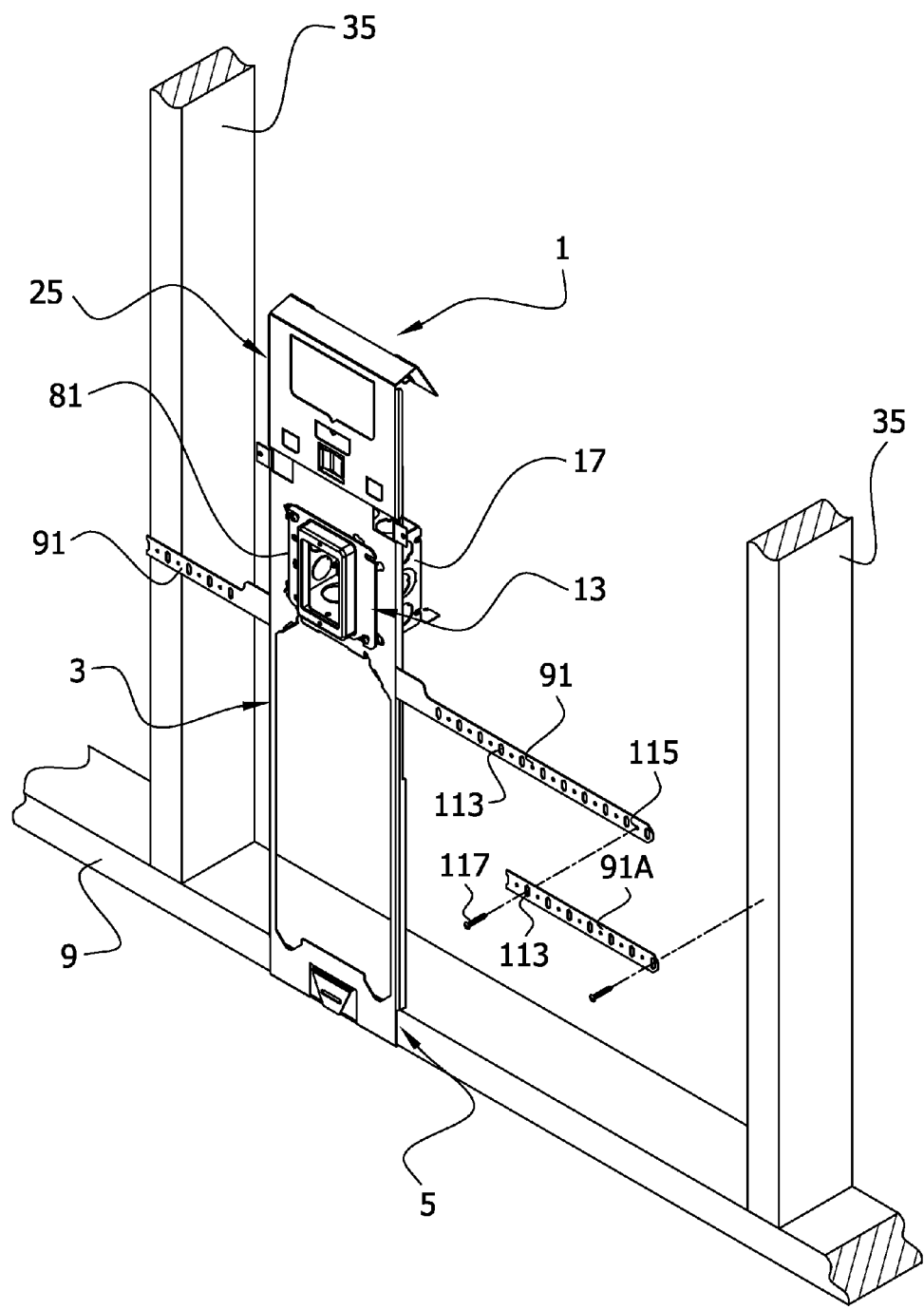
FIG. 5A is a view similar to FIG. 5 but showing a portion of one mounting arm removed and attached to the other mounting arm to extend the reach of that arm.
Figure 7:
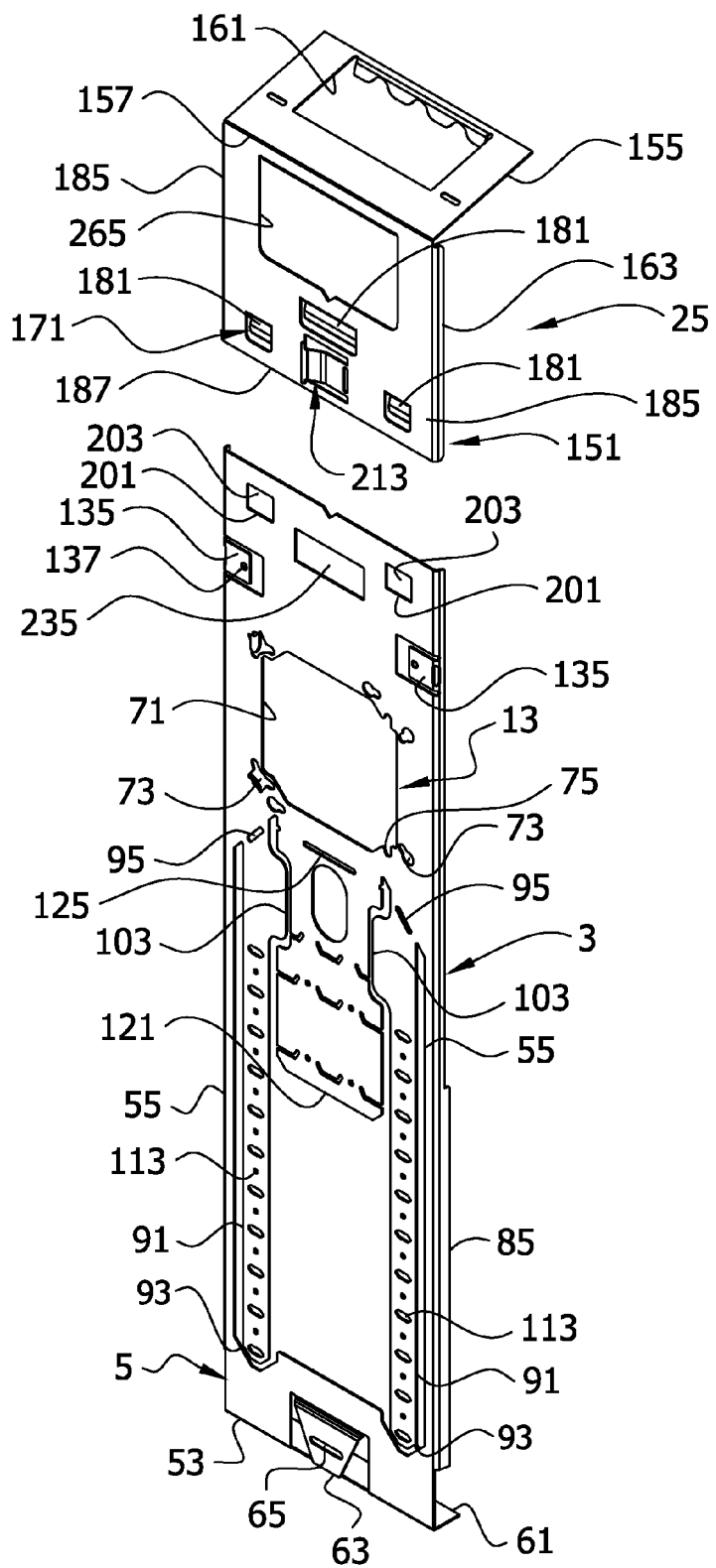
FIG. 7 is a front perspective showing an optional cable-containment section of the floor stand exploded away from a box-mounting section of the floor stand.
Figure 8:
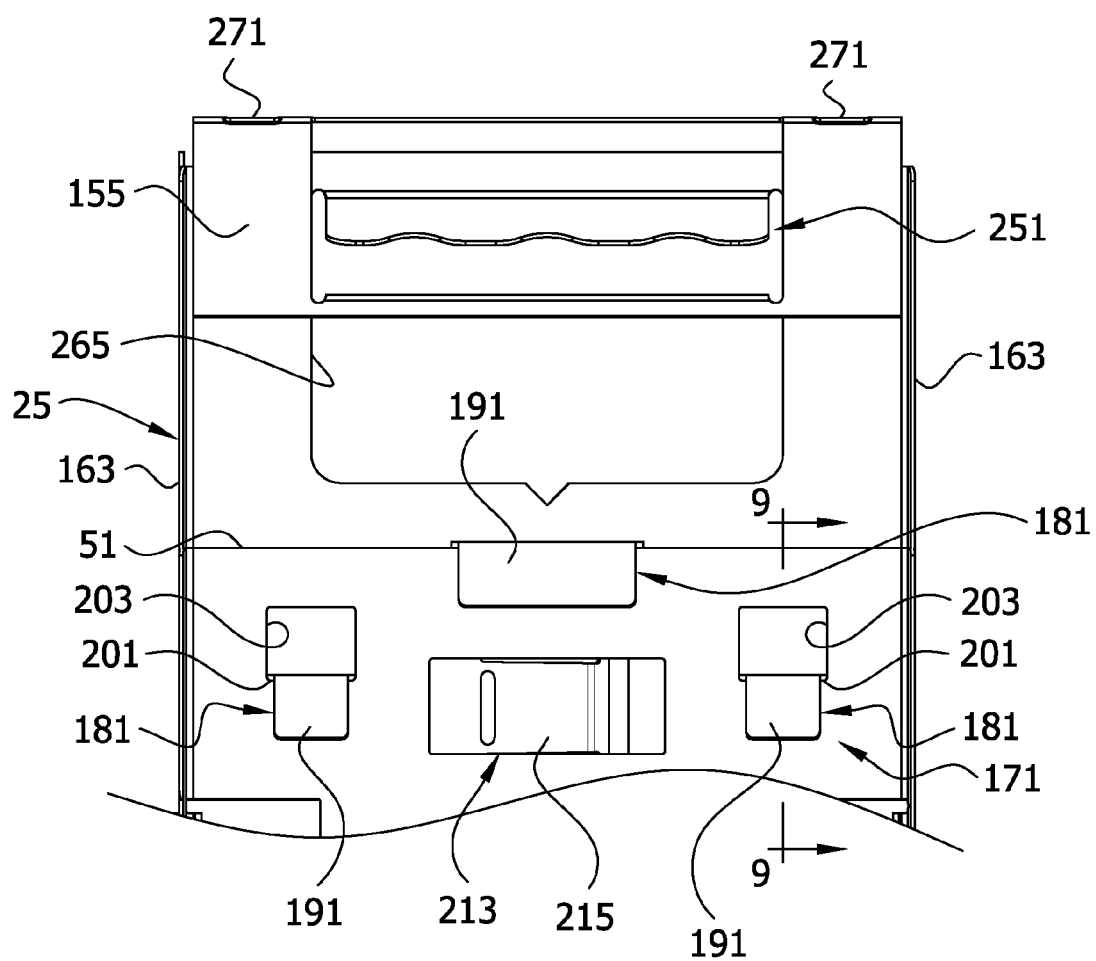
FIG. 8 is an enlarged rear elevation of a portion of the floor stand showing the cable-containment section clipped to the box-mounting section.
Figure 9:
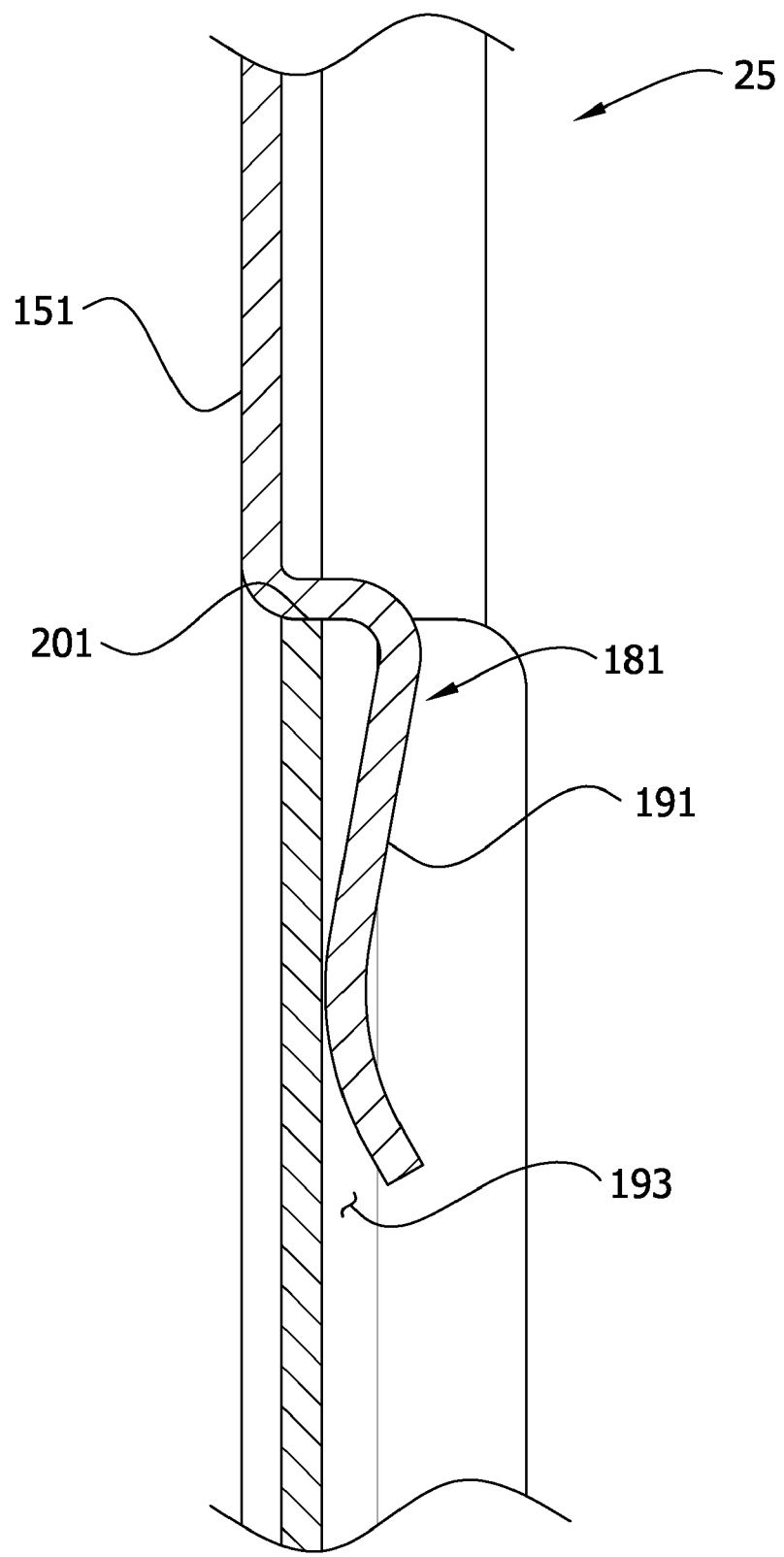
FIG. 9 is an enlarged vertical section on lines 9-9 of FIG. 8.
Figure 10:
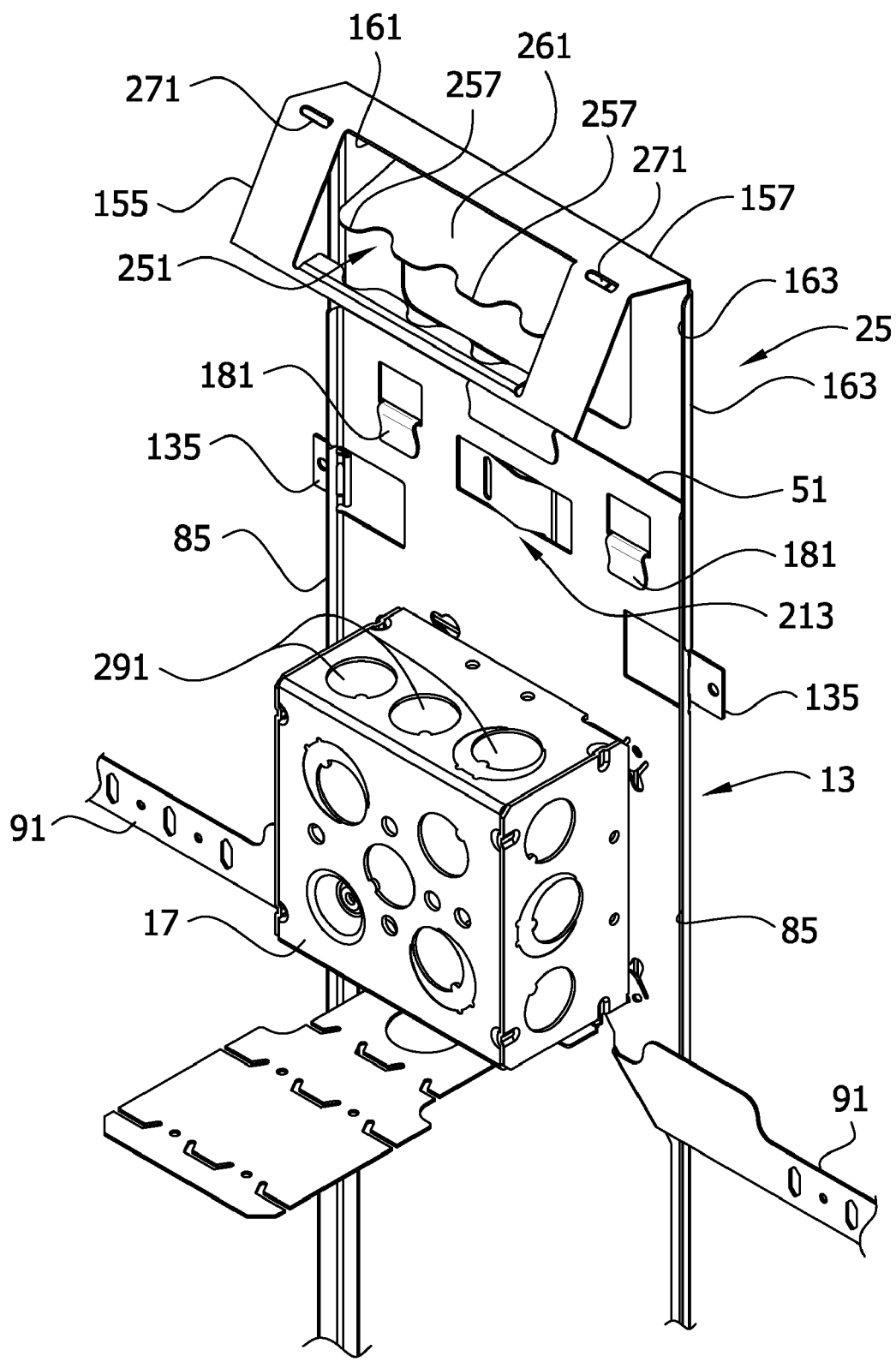
FIG. 10 is a rear perspective of the upper portion of the floor stand shown in FIG. 5.

Each arm 91 has a series of fastener holes spaced along the arm for receiving one or more fasteners to secure the arm to a respective stud 35. In one embodiment, the fastener holes include a plurality of slots 113 each extending generally transverse to the length of the arm and a plurality of circular holes 115 located about midway between the slots. If desired, the arms 91 can be bent or broken at any slot location to vary the length of one or both arms. FIG. 5A illustrates how a portion 91A of one arm 91 can be removed and attached to the other arm to extend the reach of one arm if needed. The portion 91A of the one arm is removed by breaking the arm at an appropriate slot 113 either by manually flexing the arm back and forth until it breaks or by cutting or otherwise severing the arm using a cutting tool. The removed arm portion 91A is then attached to the other arm by a fastener 117 (e.g., a self-tapping screw) extending through a slot 115 in the arm portion 91A and a hole 115 in the other arm 91 to provide the extra length needed to reach a wall stud 35. As a result, the floor stand can be located at any position between the two wall studs. In general, the slots 113 define lines of weakness extending transversely of the arms 91 at intervals spaced lengthwise of the arms for removing a portion of an arm (e.g., 91A) so that it can be used to extend the reach of the other arm 91. The lines of weakness can be defined in other ways (e.g., perforations or score lines).

Other integral mounting arm configurations are possible. By way of example, the two integral mounting arms 91 can be disposed outboard (rather than inboard) of the sides 55 of the body 3. In this configuration, the arms would have an integral connection with the body and be bendable from a position in which the arms are desirably generally co-planar with the body to a position in which the arms extend laterally outward from the body at opposite sides of the body for attachment to the adjacent wall studs to stabilize the floor stand. Alternatively, one mounting arm could be positioned inboard and another outboard. Still further, the number of mounting arms can vary from one to two or more. For example, four mounting arms could be integrally formed with the body, e.g., two upper arms extending down as shown in FIG. 4 and two lower arms extending up from the lower section 5, the two lower arms being bendable in the same manner as the upper arms. In still another configuration, the two mounting arms 91 in FIG. 4 could be attached to the body 3 at locations above the box-mounting opening 71 and extend down on the body at opposite sides of the opening.

Figure 3:
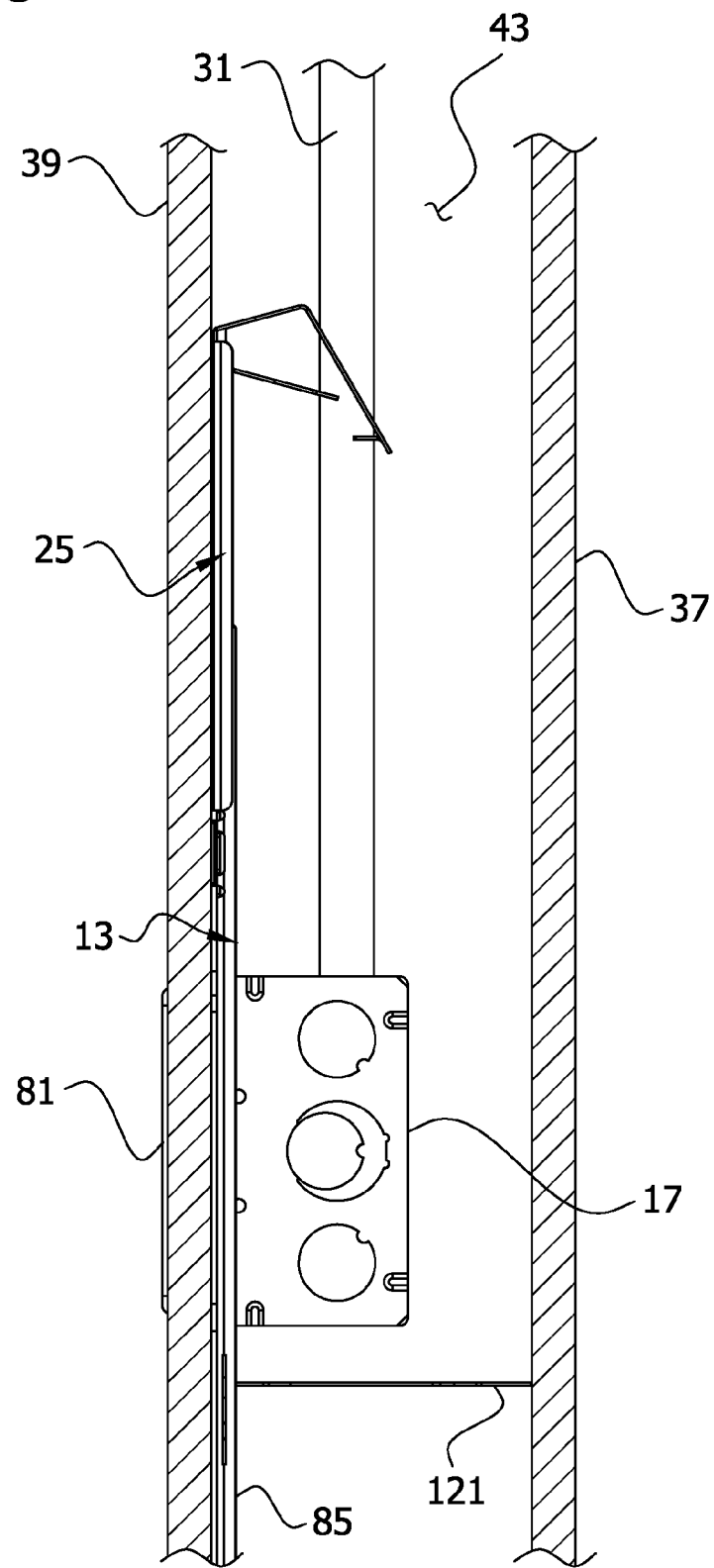
FIG. 3 is an enlarged vertical section on line 3-3 of FIG. 2.

The floor stand 1 further comprises a stand-off support 121 (sometimes referred to as a "far-side support") integrally formed as one piece with the sheet metal body 3 below the box-mounting section 13 and between the two mounting arms 91. The stand-off support 121 is bendable about a bend line 125 extending transverse to the longitudinal axis 101 of the body from a first position generally co-planar with the body (FIG. 4) to a second (FIGS. 3 and 5) position extending rearward from the body for engaging a back wall surface of the rear dry wall section 37. The bend line 125 is defined by a transverse slot (also designated 125) in the body. The stand-off support 121 has a number of additional bend lines defined by slots 131 (FIG. 6) spaced along its length so that the length of the support can be varied according to the depth of the wall cavity.

The floor stand 1 also includes a pair of mounting tabs 135 integrally formed as one piece with the sheet metal body 3 adjacent opposite sides 55 of the body. In the embodiment of FIG. 4, the tabs 135 are located at a height immediately above the top of the central box opening 71 in the floor stand, but this location may vary. The mounting tabs 135 are bendable from positions inboard of respective sides of the body (FIG. 4) to positions projecting laterally outward from respective sides (FIG. 5). At least one fastener hole 137 in provided in each mounting tab 135 for fastening the sheet metal body to a wall stud 35 if the stud is immediately adjacent one side of the floor stand. In this case, it may not be necessary or even possible to effectively use either mounting arm 91.

FIG. 6 shows a flat pattern of the body of the floor stand 1 after it has been stamped but before it has been bent to form the final components of the section, described above.

The overall height of the floor stand 1 will vary depending on the desired height at which an electrical box 17 is to be mounted above the floor. Typical box heights (from the floor to the centerline of the box) are 15, 18 and 24 in., but other distances are possible and the floor stand can be configured accordingly. Similarly, the overall "wingspan" of the floor stand when the mounting arms 91 are bent to extend outward will vary. Vertical wall studs are usually placed on 16 in. or 24 in. centers, so that desirably the wingspan is equal to or greater than these distances. Further, there are benefits to sizing the arms 91 to have lengths sufficient to allow the floor stand 1 to be mounted at any location between two adjacent wall studs 35. By way of example but not limitation, the body 3 has a width dimension 141 (FIG. 5) of about six in., and each arm has a length dimension sufficient to provide an overall "wingspan" from the tip of one arm 91 to the tip of the opposite arm of about 24 in. for a floor support having a box-mounting height of 15 in., an overall "wingspan" of about 30 in. for a floor support having a box-mounting height of 18 in., and an overall "wingspan" of about 30 in. for a floor support having a box-mounting height of about 24 in.

Referring to FIGS. 7-14, the optional cable-containment section 25 comprises a lower portion 151 adapted for connection to the box-mounting section 13, a cable-containing flap 155 bendable about a bend line 157 to extend rearward from an upper edge of the lower portion, and at least one opening 161 in the flap for receiving the cable 31 passing to or from the electrical box. The cable 31 may be of any type, including but not limited to armored cable (AC), metal clad cable (MC), non-metallic cable (NM) and flexible metal conduit (FMC). Flanges 163 are provided along opposite sides of the lower portion 151 of the cable-containment section for reinforcement. Desirably, the cable-containment section 25 is integrally formed as one piece of a suitable material such as sheet metal.

A quick-connect mechanism generally designated 171 is provided for connecting the lower portion 151 of the cable-containment section 25 to the box-mounting section 13.

In one embodiment, this mechanism 171 comprises a plurality of clips 181 on the cable-containment section for releasable engagement with the box-mounting section. Referring to FIGS. 7-10, three such clips 181 are shown, two clips 181 being located generally adjacent opposite sides 185 and a lower edge 187 of the cable-containment section 25 and the third clip 181 being located generally at a central location between and immediately above the two side clips. (The number of clips 181 and their locations may vary.) Each of the two side clips 181 comprises a relatively narrow cantilever arm 191 (FIG. 9) struck from the lower portion 151 of the cable-containment section 25 to extend down on the rear face of the section. Similarly, the central clip 181 comprises a relatively wide cantilever arm 191 struck from the lower portion 151 of the cable-containment section to extend down the rear face of the section. As shown best in FIG. 9, the lower ends of the three cantilever arms 191 are flared rearward to provide lead-ins 193 to receive respective edges of the box-mounting section 13, namely, a top edge defining the upper end 51 of the box-mounting section 13 and the bottom edges 201 of two openings 203 in the box-mounting 13 section spaced below the top edge 51 and generally adjacent opposite sides 55 of the section.

To connect the cable-containment and box-mounting sections 25, 13, the cable-containment section 25 is placed in a position in which the top edge 51 of the box-mounting section 13 is at the lead-in 193 of the central clip and the two side clips 181 are received in the side openings 203 of the box-mounting section. In this position, the rear face of the lower portion 151 of the cable-containment section 25 is generally flat against the front face of the upper end of the box-mounting section 13 with the side flanges 85 of the box-mounting section received between the side flanges 163 of the cable-containment section (see FIG. 10). The cable-containment and box-mounting sections 25, 13 are then telescoped together which causes the cantilever arms 191 of the clips 181 to deflect rearward and apply a friction force tending to hold the cable-containment and box-mounting sections flat against one another. The telescopic movement continues until the clips 181 are fully seated against respective edges of the box-mounting section 13, i.e., until the top edge 51 of the box-mounting section seats against the upper end of the central clip 181 and the bottom edges 201 of the side openings 203 in the box-mounting section seat against the upper ends of the side clips 181 (see FIGS. 8-10). In this position, the cable-containment and box-mounting sections are held tightly together. In one embodiment, the clips 181 are of a non-resilient material. In other embodiments, the clips may be resilient to provide a spring force tending to clamp the cable-containment and box-mounting sections 25, 13 together.

Figure 12:
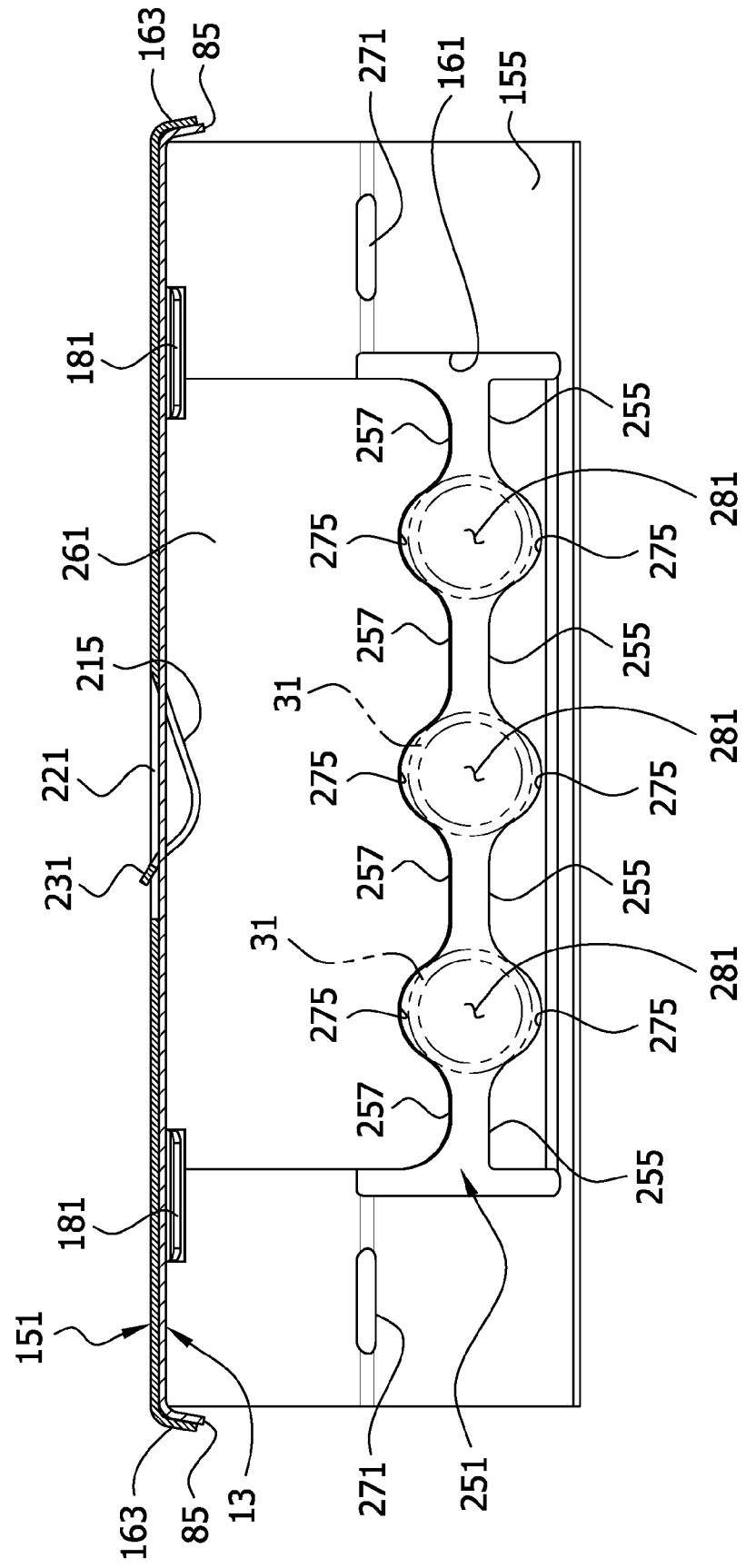
FIG. 12 is an enlarged horizontal section on lines 12-12 of FIG. 4 showing details of the cable-containment section of the floor stand.
Figure 13:
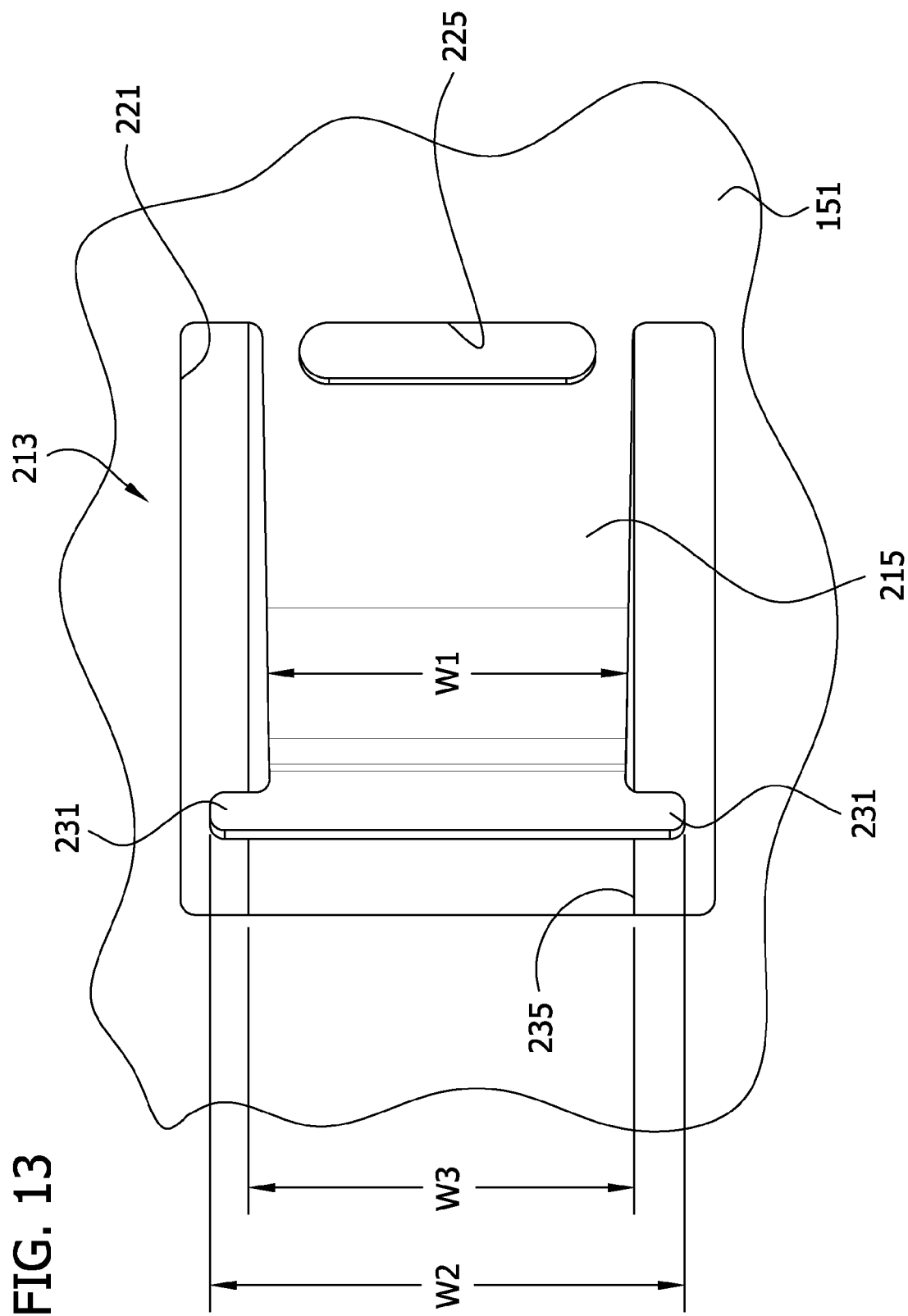
FIG. 13 is an enlarged front elevation of FIG. 4 showing details of the cable containment device.
Figure 14:
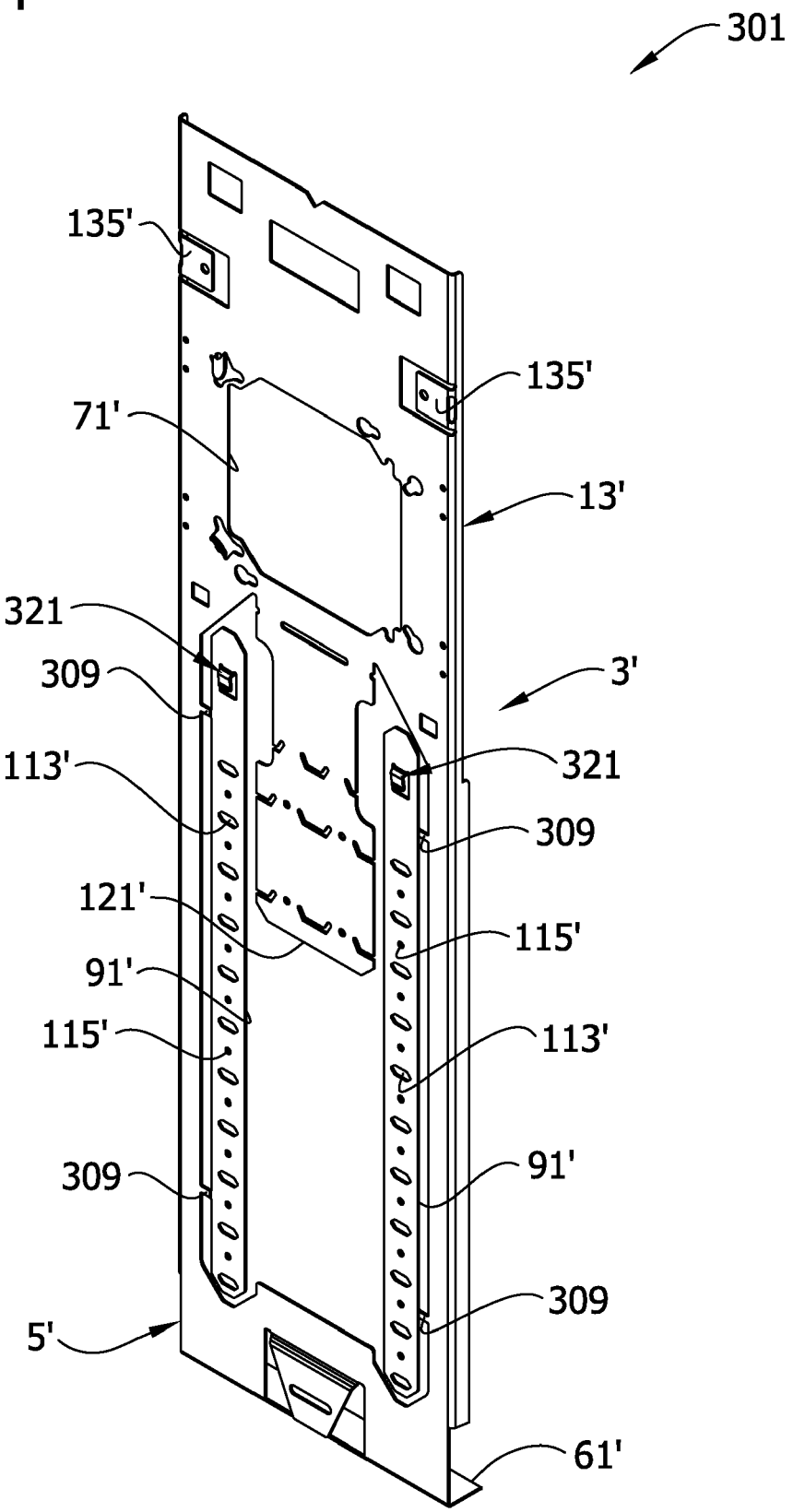
FIG. 14 is a front perspective of a second embodiment of a floor stand of this invention having detachable mounting arms.

An additional locking mechanism, generally designated 213, is provided for holding the cable-containment and box-mounting sections 13, 25 together against axial forces tending to pull them apart. As best shown in FIGS. 12 and 13, this mechanism 213 comprises a locking member 215 struck from the lower portion 151 of the cable-containment section 25 to create an opening 221 in the section. The locking member 215 is an elongate cantilever member attached at one end to the cable-containment section 25 and free at its other end. The cantilever member 215 is bendable about a generally vertical bend line defined by slot 225 adjacent the attached end of the member. The member 215 has a width W1 along its length except adjacent its free end, which has a somewhat greater width W2 provided by lateral extensions 231. When the cable-containment section 25 is connected to the box-mounting section 13, the opening 221 in the lower portion 151 of the cable-containment section aligns with an opening 235 in the box-mounting section 13. The latter opening 235 has a length greater than the length of the cantilever member and a width W3 which is greater than width W1 of the cantilever member but less than width W2 of the cantilever member 215. As a result, the cantilever member 215 can be pushed rearward into the opening 235 in the box-mounting section 13 to prevent inadvertent separation of the cable-containment and box-mounting sections. The free end of the cantilever member 215 cannot be pushed entirely through the opening 235 due to the increased width of the lateral extensions 231 which contact areas of the box-mounting section above and below the opening.

The box-mounting and cable-containment sections 13, 25 may be disconnected simply by reversing the above procedure. It will be understood that other types of mechanisms may be used for connecting the two sections, and that the connection may be either a releasable connection or a permanent connection as by rivets or welding.

Figure 11:
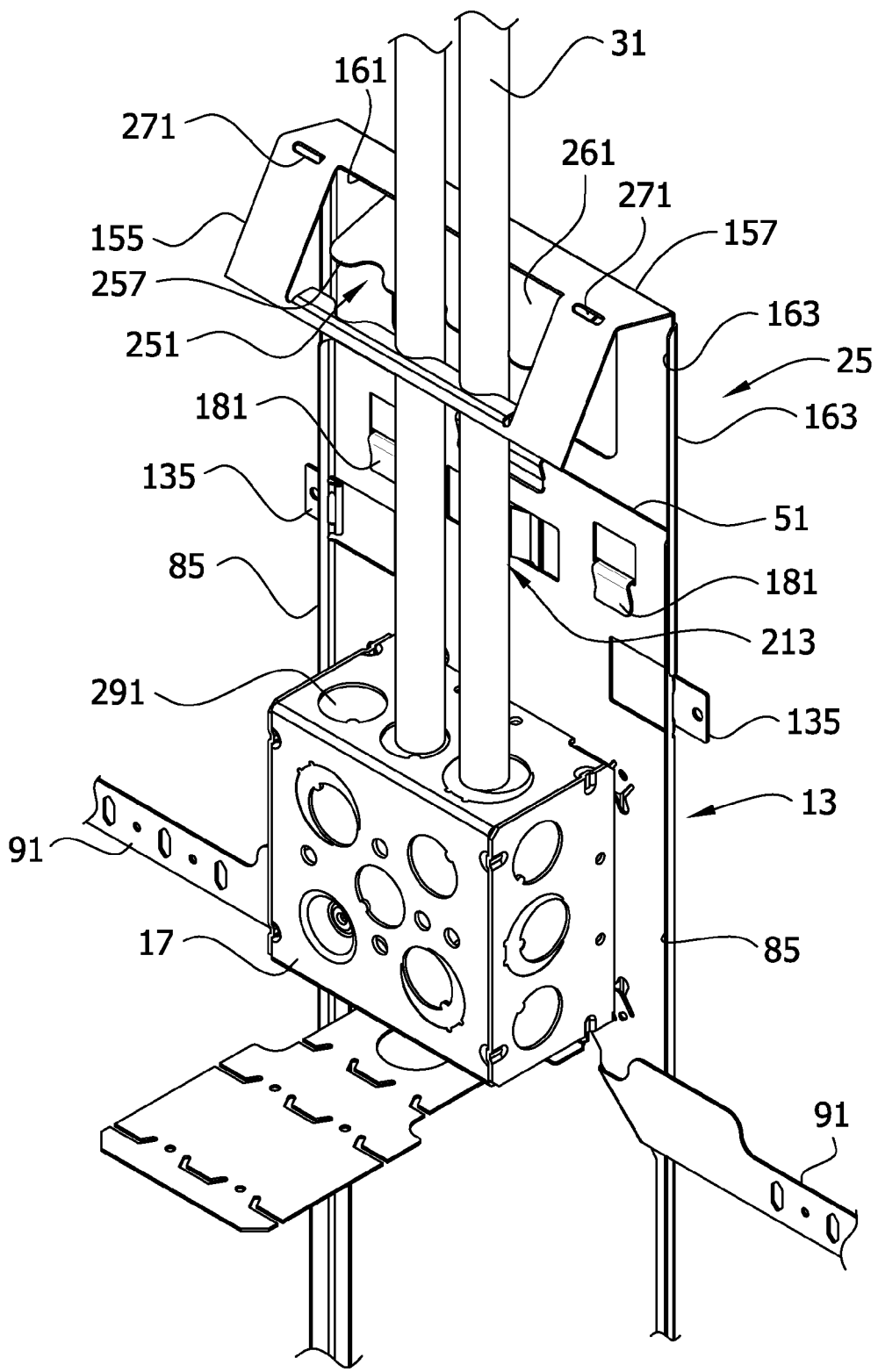
FIG. 11 is a view similar to FIG. 10 showing cable held by a cable holding mechanism.

The cable-containment section 25 includes a holding mechanism, generally designated 251, associated with the flap 155 for holding the cable in place. In the embodiment of FIGS. 8-13, the holding mechanism 251 comprises a first set of one or more holding members 255 on the flap and a second set of one or more holding members 257 on a second (lower) flap 261 disposed below the upper flap. The second flap 261 is desirably integrally formed as one-piece with the cable-containment section 25 by bending a piece of sheet metal from the lower portion 151 so that it extends in a generally rearward direction, thereby creating an opening 265 in the lower portion of the cable-containment section. The upper flap 155 is bendable about a bend line defined by slots 271 (or other means) to cause the first and second sets of holding members 255, 257 to engage the cable and hold the cable 31 in place, as illustrated in FIG. 11. In this embodiment, the holding members 255, 257 on each of the two flaps 155, 261 are separated by notches 275, and the notches on one flap cooperate with the notches on the other flap to define a series of separate spaced-apart openings 281 for holding individual cables in spaced-apart relation (see FIG. 12). Conventional electrical boxes often have three knock-outs 291 (FIG. 10) in their tops for electrical cable. Accordingly, in one embodiment, the holding mechanism 251 defines three openings 281, one corresponding to each knock-out 291. It will be understood that the number of holding members 255, 257 and their shapes may vary without departing from the scope of this invention.

The holding mechanism 251 is dimensioned to engage the cable 31 at a location relatively close to the electrical box. Some codes require this distance to be no more than about 12 inches, so the holding mechanism should be appropriately dimensioned. Further, it is desirable that the cable-holding opening(s) 281 defined by the holding mechanism 251 be located substantially directly above the knockouts 291 in the top of the electrical box 17 so that the cable 31 extends vertically between the box and the openings.

Other types of holding mechanisms may be used on the cable-containment section 25 for holding the cable in place.

FIGS. 14-17 show a second embodiment of a floor stand of this invention, generally designated 301. The floor stand is similar in many respects to the floor stand 1 of the first embodiment, and corresponding parts are indicated by the same reference numbers plus the prime (') designation. In this embodiment, the mounting arms 91' and body 3' are initially formed as one integral part, as in the first embodiment. However, the arms 91' are designed to be detached from the body and then re-attached to the body in the position shown in FIG. 15 in which one or both arms extend laterally out from respective sides of the body. Fastener openings 113', 115' are spaced along each mounting arm 91' for receiving one or more fasteners to secure the arm to a wall stud (e.g., stud 35 in FIG. 1).

The mounting arms 91' have frangible connections 309 with the body 3' to permit detachment of the mounting arms from the body. In the illustrated embodiment, the frangible connections 309 are narrow webs of sheet metal initially formed (e.g., in a stamping operation) integrally with the body 3' and the mounting arms 91'. Any number of frangible connections 309 may be used. By way of example, each arm 91' may have two such connections 309 with the body, namely, a first connection generally adjacent an upper end of the arm and a second connection generally adjacent a lower end of the arm. The webs 309 are relatively narrow (e.g., 0.125 to 0.250 in.) and easily broken by hand or with the aid of a tool.

Figure 15:
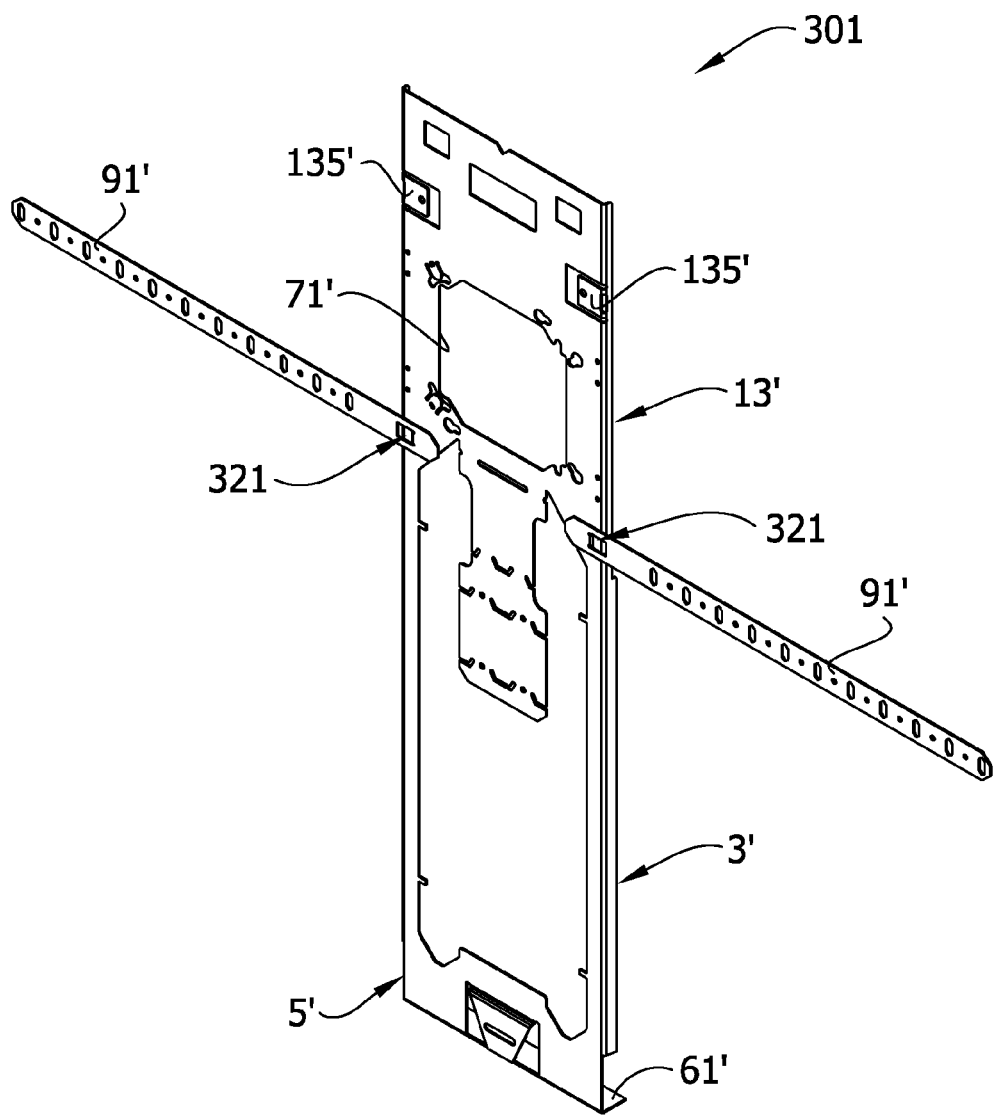
FIG. 15 is a view similar to FIG. 14 but showing the arms detached from their FIG. 14 position and re-attached to the body of the stand in a mounting position extending out from opposite sides of the body.

The floor stand 301 also includes a device, generally designated 321, for re-attaching each mounting arm 91' to the body 3' in a position in which the arm extends laterally out from a side of the body, as shown in FIG. 15. In one embodiment, this device 321 comprises a tongue 325 on the mounting arm 91' adjacent one end of the mounting arm, and a tongue-receiving opening 327 in the body at an appropriate location on the body, such as adjacent a side of the body immediately below the box-mounting section 13' of the body. Other devices (e.g., sheet metal screws) may be used for re-attaching the mounting arms 91' to the body 3'.

Figure 16:
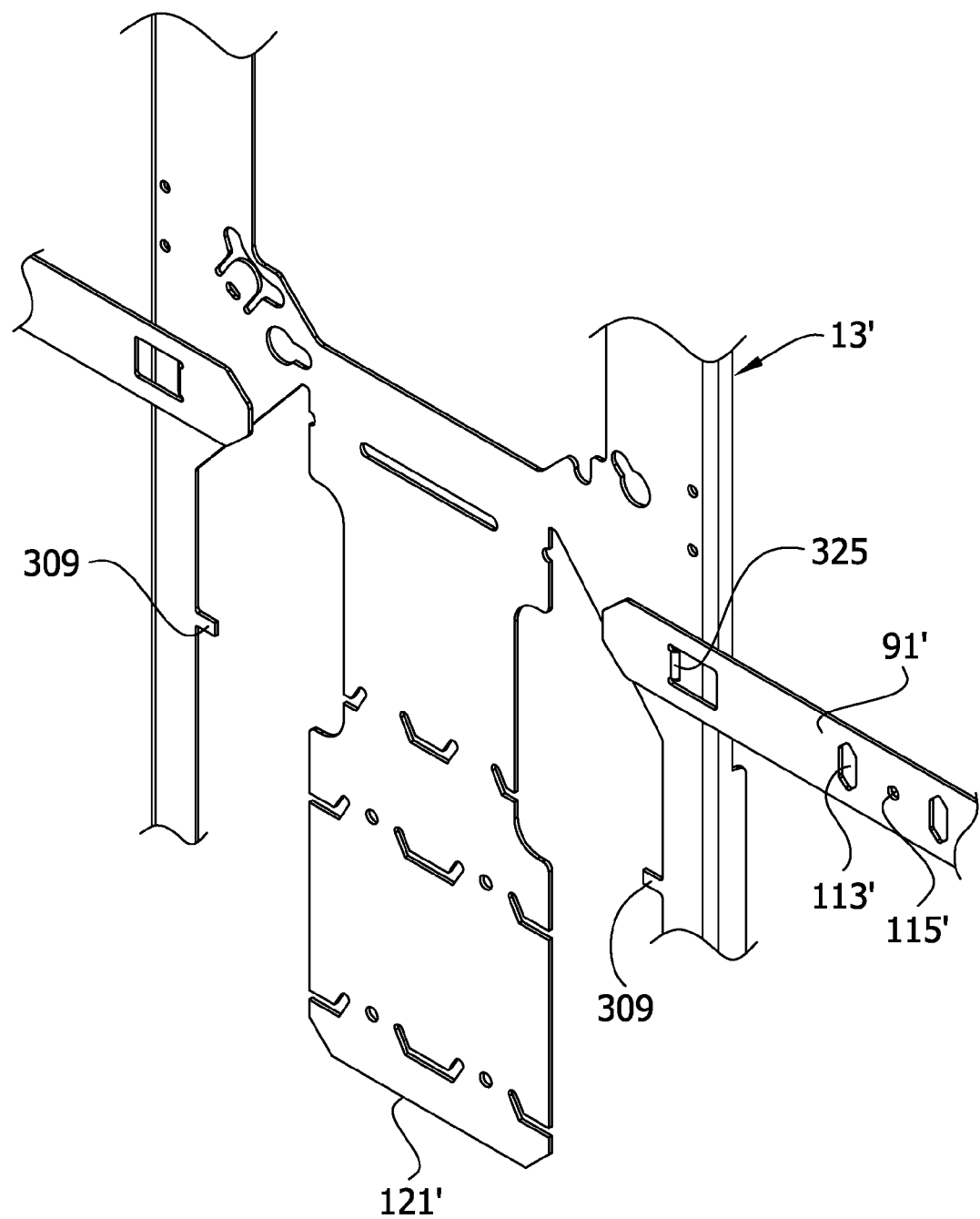
FIG. 16 is an enlarged portion of FIG. 15 showing details of a device for re-attaching the arms to the body.
Figure 17:
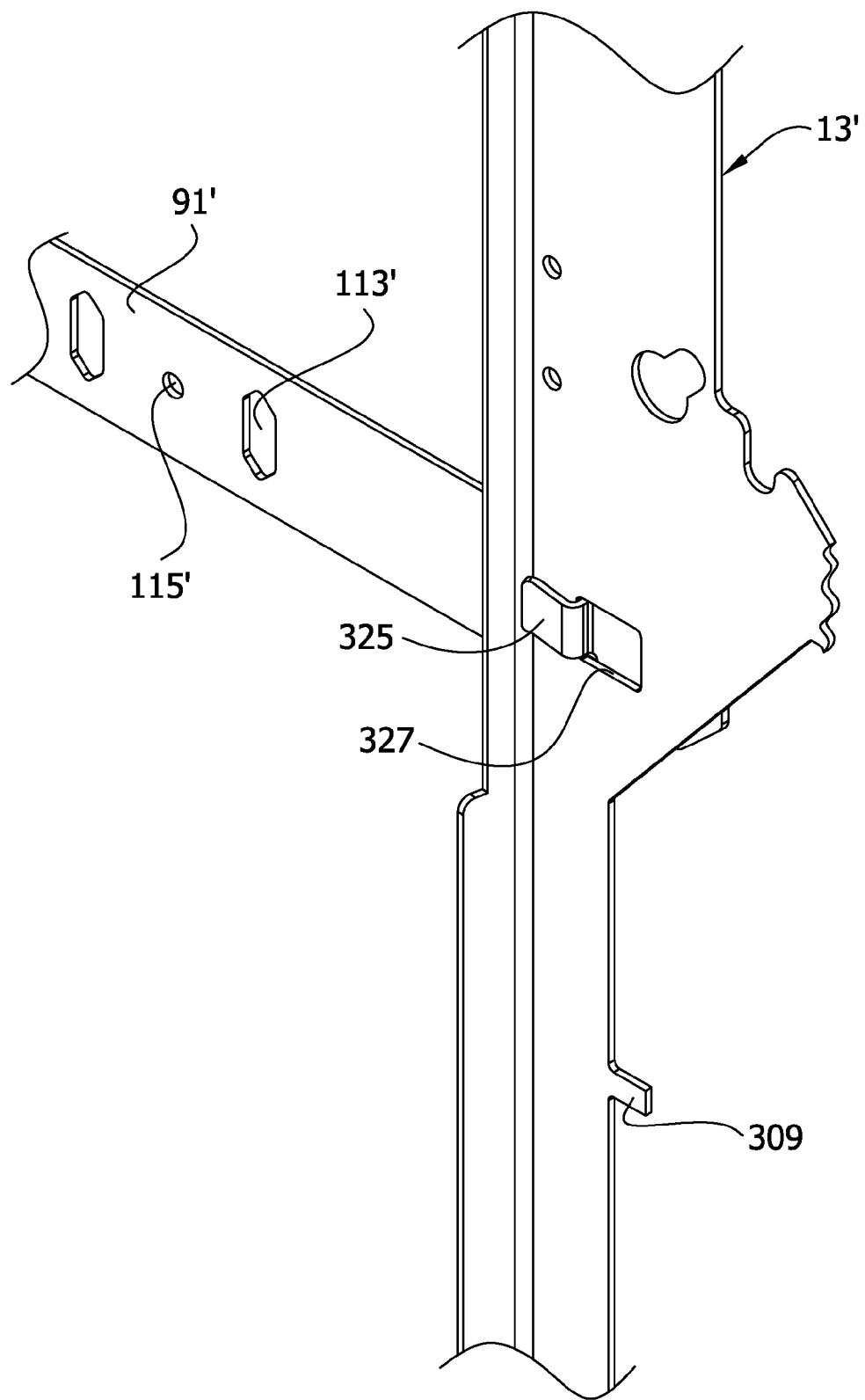
FIG. 17 is a rear perspective of FIG. 16 showing the details of the re-attachment device.

In use, one or both mounting arms 91' (usually both) are detached from the body 3' by breaking the frangible connections 309 and re-attaching the arms to the body using the device(s) 321. This is accomplished by inserting the tongue 325 on each mounting arm 91' into a respective tongue-receiving slot 327 on the body 3' (FIGS. 16 and 17). The mounting arms 91' are then secured to a respective wall stud 35 using one or more fasteners 117 inserted through one or more fastener openings 113', 115' in the mounting arms. A portion 91A' of one arm 91' can be broken off and attached to the other arm 91' to extend the reach of that arm in the same way described above in the first embodiment.

While the floor stand 301 of the second embodiment is illustrated without a cable-containment section, it will be understood that it may be equipped with a cable-containment section like the cable-containment section 25 of the first embodiment.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above constructions without departing from the scope of the invention, it is intended that all matter contained in the above description and shown in the accompanying drawings shall be interpreted as illustrative and not in a limiting sense.

What is claimed is:

1. A floor stand for mounting an electrical box at a location between two wall studs, comprising
 an elongate sheet metal body having opposite ends and a box-mounting section between said opposite ends configured for mounting an electrical box,
 at least one sheet metal mounting arm attached to the body, said at least one mounting arm being bendable from a first position in which it extends generally lengthwise of the body to a second position in which it extends generally laterally outward from the body for attachment to one of said wall studs, said at least one arm remaining attached to said body in said second position.

2. A floor stand as set forth in claim 1 wherein said at least one mounting arm is integrally formed as one piece with said body and remains integrally attached as one piece when in said second position.

3. A floor stand as set forth in claim 2 wherein said at least one mounting arm has an upper end attached to said sheet metal body at a location adjacent said box-mounting section and a lower end.

4. A floor stand as set forth in claim 1 wherein said at least one mounting arm is one of two mounting arms attached to the sheet metal body, said mounting arms being bendable from said first position in which the arms extend generally lengthwise of the body to a second position in which the arms extend generally laterally outward from opposite sides of the body for attachment to respective wall studs.

5. A floor stand as set forth in claim 4 wherein said sheet metal body has opposite sides extending between said opposite ends, and wherein said two mounting arms are disposed inboard of said sides when in said first position.

6. A floor stand as set forth in claim 4 wherein each of said mounting arms has a series of fastener openings spaced lengthwise along the mounting arm.

7. A floor stand as set forth in claim 4 further comprising a stand-off support integrally formed as one piece with said sheet metal body below said box-mounting section and between said two mounting arms, said stand-off support being bendable from a first position generally co-planar with said body to a second position extending rearward from the body for engaging a back wall surface.

8. A floor stand as set forth in claim 4 further comprising a pair of mounting tabs integrally formed as one piece with the sheet metal body adjacent opposite sides of the body, said mounting tabs being bendable from positions inboard of respective sides of the body to positions projecting laterally outward from respective sides, and at least one fastener hole in each mounting tabs for fastening the tab to a wall stud.

9. A floor stand as set forth in claim 8 wherein said mounting tabs are located above the upper ends of said mounting arms.

10. A floor stand as set forth in claim 1 further comprising at least one mounting tab integrally formed as one piece with the sheet metal body adjacent one side of the body, said mounting tab being bendable from a position inboard of said one side of the body to a position projecting laterally outward from said one side, and a fastener hole in the tab for fastening the tab to a wall stud.

11. A floor stand as set forth in claim 10 wherein said at least one mounting tab is located above an upper end of said at least one mounting arm.

12. A floor stand as set forth in claim 1 wherein said sheet metal body further comprises a cable-containment section above said box-mounting section for holding cable terminating in said electrical box.

13. A floor stand as set forth in claim 12 wherein said cable-containment section comprises a lower portion adapted for connection to the box-mounting section, a cable-containing flap adapted to extend rearward from an upper edge of said lower portion, at least one opening in the flap for receiving cable passing to or from the electrical box, and a cable holding mechanism associated with the flap for holding the cable in place.

14. A floor stand as set forth in claim 13 wherein said cable holding mechanism comprises a first set of one or more holding members on the flap and a second set of one or more holding members on the lower portion of the cable-containment section, said flap being bendable about a bend line to cause the first and second sets of holding members to engage the cable and hold the cable in place.

15. A floor stand as set forth in claim 12 wherein said cable-containment section comprises a separate sheet metal part adapted for connection to said box-mounting section.

16. A floor stand as set forth in claim 15 further comprising a quick-connect mechanism for connecting said cable-containment section to said box-mounting section.

17. A floor stand as set forth in claim 16 wherein said quick-connect mechanism comprises at least one clip on one section configured for releasable engagement with the other section.

18. A floor stand as set forth in claim 16 further comprising a locking mechanism for holding the cable-containment and box-mounting sections together against axial forces tending to pull them apart.

19. A floor stand as set forth in claim 4 wherein said two mounting arms are configured to have lines of weakness extending transversely of the arms at intervals spaced lengthwise of the arms whereby a portion of one arm can be removed at a selected line of weakness and then attached to the other arm to extend the reach of said other arm.

20. A floor stand for mounting an electrical box at a location between two wall studs, comprising
an elongate sheet metal body having opposite ends and a box-mounting section between said opposite ends configured for mounting an electrical box,
a first mounting arm on the body extending generally laterally outward from the body at only a first side of the body for attachment to one of said wall studs, and
a second mounting arm extending generally laterally outward from the body at only a second side of the body opposite the first side of the body for attachment to another of said wall studs,
said first and second arms being separate from one another and linearly aligned with one another.

21. A floor stand for mounting an electrical box at a location between two wall studs, comprising
an elongate sheet metal body having opposite ends and a box-mounting section between said opposite ends configured for mounting an electrical box, and
a sheet metal cable-containment section comprising a lower portion adapted for connection to the box-mounting section, a cable-containing flap adapted to extend rearward from an upper edge of said lower portion, at least one opening in the flap for receiving cable passing to or from the electrical box, and a cable holding mechanism associated with the flap for holding the cable in place.

22. A floor stand as set forth in claim 21 further comprising a quick-connect mechanism for connecting said cable-containment section to said box-mounting section.

23. A floor stand for mounting an electrical box at a location between two wall studs, comprising
an elongate sheet metal body having opposite ends and a box-mounting section between said opposite ends configured for mounting an electrical box, and
two sheet metal mounting arms having frangible connections with the body to permit detachment of the mounting arms from the body,
each mounting arm being configured for re-attachment to the body in a position in which the arm extends laterally out from a side of the body for securement to a wall stud.

24. A floor stand as set forth in claim 23 further comprising fastener openings spaced along each mounting arm for receiving one or more fasteners to secure the arm to a wall stud.

25. A floor stand as set forth in claim 23 further comprising a device for re-attaching each mounting arm to said body in said position in which the arm extends laterally out from a side of the body.

26. A floor stand as set forth in claim 25 wherein said device comprises a tongue on one of the mounting arm and body and a tongue-receiving opening in the other of the mounting arm and the body.

27. A floor stand as set forth in claim 23 wherein said frangible connections comprise breakable webs of sheet metal connecting the mounting arms to the body.

28. A floor stand as set forth in claim 23 wherein said body, mounting arms and frangible connections are formed initially as one integral part.

* * * * *